(12) United States Patent
Kim et al.

(10) Patent No.: US 10,303,027 B2
(45) Date of Patent: May 28, 2019

(54) LIQUID CRYSTAL DISPLAY DEVICE AND MANUFACTURING METHOD THEREOF

(71) Applicant: Samsung Display Co., Ltd, Yongin-si, Gyeonggi-do (KR)

(72) Inventors: Duk Sung Kim, Asan-si (KR); Seung Hyun Park, Seoul (KR); Jun Ho Song, Seongnam-si (KR); Sung Hoon Lim, Suwon-si (KR)

(73) Assignee: Samsung Display Co., Ltd. (KR)

( * ) Notice: Subject to any disclaimer, the term of this patent is extended or adjusted under 35 U.S.C. 154(b) by 116 days.

(21) Appl. No.: 15/483,749

(22) Filed: Apr. 10, 2017

(65) Prior Publication Data
US 2017/0343843 A1 Nov. 30, 2017

(30) Foreign Application Priority Data
May 26, 2016 (KR) .................. 10-2016-0064546

(51) Int. Cl.
*G02F 1/136* (2006.01)
*G02F 1/1368* (2006.01)
*G02F 1/1333* (2006.01)
*G02F 1/1343* (2006.01)
*G02F 1/1362* (2006.01)

(52) U.S. Cl.
CPC ...... *G02F 1/1368* (2013.01); *G02F 1/133345* (2013.01); *G02F 1/134309* (2013.01); *G02F 1/134327* (2013.01); *G02F 1/136286* (2013.01); *G02F 2001/13629* (2013.01); *G02F 2001/136231* (2013.01);

(Continued)

(58) Field of Classification Search
CPC ............ G02F 1/1368; G02F 1/134309; G02F 1/134327; G02F 1/13439; G02F 1/136286; G02F 1/136227
See application file for complete search history.

(56) References Cited

U.S. PATENT DOCUMENTS 6,646,692 B2 * 11/2003 Yamazaki ......... G02F 1/134363
349/141
8,107,029 B2 * 1/2012 Peng ................. G02F 1/136286
349/43

(Continued)

FOREIGN PATENT DOCUMENTS

| KR | 10-2013-0103206 A | 9/2013 |
| KR | 10-2014-0077704 A | 6/2014 |
| KR | 10-2014-0083649 A | 7/2014 |

*Primary Examiner* — James A Dudek
(74) *Attorney, Agent, or Firm* — Innovation Counsel LLP

(57) ABSTRACT

A liquid crystal display device comprising: a substrate; a gate line that is disposed on the substrate and extends in a first direction; a first insulating film that is disposed on the gate line; a semiconductor pattern that is disposed on the first insulating film; a first transparent electrode that is disposed on the semiconductor pattern, and has a first electrode and a second electrode being spaced apart from each other; a second insulating film that is disposed on the first transparent electrode and partially exposes the first electrode; a data line disposed on the second insulating film and extends in a second direction different from the first direction; a second transparent electrode that is disposed on the second insulating film and at least partially overlaps the second electrode; and a connecting electrode in direct contact with a portion of the exposed first electrode and the data line.

16 Claims, 20 Drawing Sheets

(52) U.S. Cl.
CPC ............ *G02F 2001/136295* (2013.01); *G02F 2202/02* (2013.01); *G02F 2202/10* (2013.01)

(56) References Cited

U.S. PATENT DOCUMENTS

| | | | |
|---|---|---|---|
| 9,360,727 B1* | 6/2016 | Su | G02F 1/136286 |
| 2008/0204614 A1* | 8/2008 | Aota | G02F 1/134363 |
| | | | 349/33 |
| 2013/0161604 A1* | 6/2013 | Huang | G02F 1/13458 |
| | | | 257/43 |
| 2014/0104527 A1* | 4/2014 | Yang | H01L 27/1225 |
| | | | 349/43 |
| 2015/0235585 A1* | 8/2015 | Kim | G09G 3/18 |
| | | | 345/103 |
| 2016/0328058 A1* | 11/2016 | Peng | G06F 3/0412 |
| 2018/0107301 A1* | 4/2018 | Kimura | G06F 3/044 |
| 2018/0188581 A1* | 7/2018 | Peng | G02F 1/133345 |
| 2018/0210299 A1* | 7/2018 | Mochizuki | G02F 1/136209 |

* cited by examiner

LIQUID CRYSTAL DISPLAY DEVICE AND MANUFACTURING METHOD THEREOF

This application claims priority from Korean Patent Application No. 10-2016-0064546 filed on May 26, 2016 in the Korean Intellectual Property Office, the disclosure of which is incorporated herein by reference in its entirety.

BACKGROUND OF THE INVENTION

1. Field of the Invention

The inventive concept relates to a liquid crystal display device and a method of manufacturing the same.

2. Description of the Related Art

The importance of display devices has increased with the development of multimedia. Various types of display devices such as a liquid crystal display (LCD) and an organic light emitting display (OLED) are used.

Among them, the liquid crystal display device is one of the flat panel display devices that are most widely used at present, and includes two substrates formed with field-generating electrodes, such as a pixel electrode and a common electrode, and a liquid crystal layer interposed therebetween. The liquid crystal display device displays an image by applying a voltage to the field-generating electrodes to form the electric field in the liquid crystal layer, and by determining the directions of the liquid crystal molecules of the liquid crystal layer and controlling the polarization of incident light through the electric field.

Meanwhile, since a separate additional mask process for forming an organic film is required for a liquid crystal display device which adopts the organic film, the liquid crystal display device is unfavorable in terms of efficiency of the process and cost.

SUMMARY OF THE INVENTION

An aspect of the inventive concept provides a liquid crystal display device with improved process efficiency and a method of manufacturing the same.

Another aspect of the inventive concept provides a liquid crystal display device that is favorable in terms of efficiency of the process and cost by reducing the number of masks, and a method of manufacturing the same.

An exemplary embodiment of the inventive concept discloses a liquid crystal display device comprising: a substrate; a gate line that is disposed on the substrate and extends in a first direction; a first insulating film that is disposed on the gate line; a semiconductor pattern that is disposed on the first insulating film; a first transparent electrode that is disposed on the semiconductor pattern, and has a first electrode and a second electrode being spaced apart from each other; a second insulating film that is disposed on the first transparent electrode and partially exposes the first electrode; a data line that is disposed on the second insulating film and extends in a second direction different from the first direction; a second transparent electrode that is disposed on the second insulating film and at least partially overlaps the second electrode; and a connecting electrode that is in direct contact with a portion of the exposed first electrode and the data line.

The liquid crystal display device may have the first electrode and the second electrode be in direct contact with the semiconductor pattern.

The liquid crystal display device may have the first electrode and the second electrode overlap the semiconductor pattern, except in a region overlapping a channel of a switching element.

The liquid crystal display device may further include: a gate electrode which is disposed on the same layer as the gate line and extends from the gate line; and the second electrode comprises a drain region that overlaps the gate electrode, and a pixel region that overlaps the second transparent electrode.

The liquid crystal display device may have the first electrode overlap the gate electrode.

The liquid crystal display device may further include: a switching element in which the gate line is electrically connected to the gate electrode, the data line is electrically connected to the first electrode, and the pixel region is electrically connected to the drain region.

The liquid crystal display device may have the semiconductor pattern comprise an oxide semiconductor.

The liquid crystal display device may have the connecting electrode comprise a transparent conductive material.

The liquid crystal display device may further include: a data retention line that is disposed on the second insulating film and extends in the second direction.

The liquid crystal display device may have the second transparent electrode comprise a plurality of slit portions.

An exemplary embodiment of the inventive concept also discloses a liquid crystal display device comprising: a substrate; a gate conductor that is disposed on a substrate, and comprises a gate line extending in a first direction and a gate electrode extending from the gate line; a first insulating film that is disposed on the gate conductor; a semiconductor pattern that is disposed on the gate conductor; a first transparent electrode that is disposed on the semiconductor pattern, and has a first electrode that overlaps the gate electrode, and a second electrode spaced apart from the first electrode at a predetermined distance; a second insulating film that is disposed on the first transparent electrode and partially exposes the first electrode; a data line that is disposed on the second insulating film and extends in a second direction different from the first direction; a second transparent electrode that is disposed on the second insulating film and at least partially overlaps the second electrode; and a connecting electrode that is in direct contact with the exposed first electrode and the data line.

The liquid crystal display device may have the first electrode and the second electrode in direct contact with the semiconductor pattern.

The liquid crystal display device may have the first electrode and the second electrode overlap the semiconductor pattern, except in a region overlapping a channel of a switching element.

The liquid crystal display device may have the second insulating film comprise an inorganic substance.

The liquid crystal display device may have the connecting electrode comprise at least one of indium tin oxide (ITO) and indium zinc oxide (IZO).

The liquid crystal display device may have the connecting electrode cover the top of the data line.

An exemplary embodiment of the inventive concept discloses a method of manufacturing a liquid crystal display device, the method comprising: forming a gate line extending in a first direction and a gate electrode extending from the gate line on the substrate; forming a first insulating film on the gate line and the gate electrode; laminating a semiconductor layer and a first transparent conductive layer on the first insulating film; forming a first photosensitive film pattern on the first transparent conductive layer, the first photosensitive film pattern comprising a first region having a first thickness, and a second region having a second thickness smaller than the first thickness; forming a second transparent conductive layer and a semiconductor pattern, by etching the first transparent conductive layer and the semiconductor layer, using the first photosensitive film pattern as a mask; forming a second photosensitive film pattern exposing some of the second transparent conductive layer, by removing the second region; and forming a first transparent electrode comprising a first electrode overlapping the gate electrode and a second electrode spaced apart from the first electrode, by etching the exposed second transparent conductive layer, using the second photosensitive film pattern as a mask. The method may have the first electrode and the second electrode in direct contact with the semiconductor pattern.

The method may have the first electrode and the second electrode overlap the semiconductor pattern, except in a region overlapping a channel of a switching element.

The method may further include: forming a second insulating film on the first transparent electrode to partially expose the first electrode; forming a data line on the second insulating film, the data line extending in a second direction different from the first direction; and forming a second transparent electrode and a connecting electrode on the second insulating film, the second transparent electrode overlapping the second electrode, and the connecting electrode connecting the exposed first electrode with the data line.

BRIEF DESCRIPTION OF THE DRAWINGS

The above and other aspects and features of the inventive concept will become more apparent by describing in detail exemplary embodiments thereof with reference to the attached drawings, in which.

DETAILED DESCRIPTION OF THE INVENTION

Figure 1:
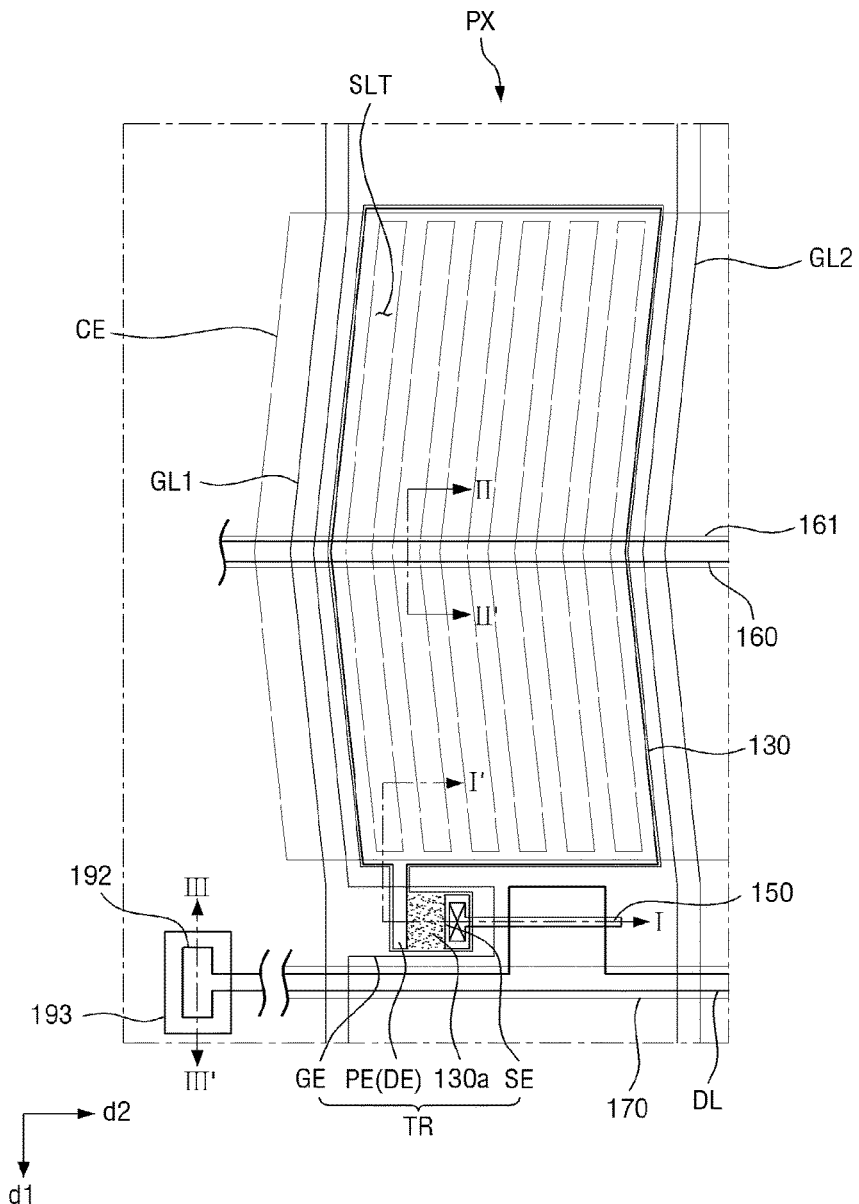
FIG. 1 is a layout diagram schematically illustrating a pixel portion of a liquid crystal display device according to an embodiment of the inventive concept.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, exemplary embodiments will be described with reference to the accompanying drawings.

FIG. 1 is a layout diagram schematically illustrating a pixel portion of a liquid crystal display device according to an embodiment of the inventive concept.

The pixel portion PX may be electrically connected to a first gate line GL1 and a data line DL. On the basis of FIG. 1, the pixel portion PX may be located in a region that is partitioned by the first gate line GL1, the second gate line GL2 and the data line DL. The first and second gate lines GL1, GL2 may extend in a first direction d1. The data line DL may extend in a second direction d2 different from the first direction d1. The first direction d1 may perpendicularly intersect with the second direction d2. On the basis of FIG. 1, the first direction d1 is described as a column direction, and the second direction d2 is described as a row direction. The first gate line GL1 receives a gate signal from a gate driver and may provide the gate signal to the pixel portion PX.

The data line DL receives a data signal from a data driver and may provide the data signal to the pixel portion PX. More particularly, the liquid crystal display device according to an embodiment of the inventive concept may further include a data pad portion 193 which is connected to a distal end 192 of the data line DL. The data pad portion 193 may connect the distal end 192 of the data line DL to an external device. The data pad portion 193 may be made of a transparent conductive material, such as indium tin oxide (ITO) or indium zinc oxide (IZO), for example.

The pixel portion PX may include a switching element TR, and a pixel electrode PE electrically connected to the switching element TR. The switching element TR may be a three-terminal element such as a thin film transistor, for example. Hereinafter, the switching element TR will be described as a thin film transistor as an example. The gate electrode GE of the switching element TR may be electrically connected to the first gate line GL1, and the source electrode SE may be electrically connected to the data line DL. The drain electrode DE of the switching element TR may be electrically connected to the pixel electrode PE. Thus, the switching element TR is turned on in accordance with the gate signal provided from the first gate line GL1, and may provide the data signal, which is provided from the data line DL, to the pixel electrode PE.

The pixel electrode PE may be formed integrally with the drain electrode DE of the switching element TR. The pixel electrode PE will be described later with reference to FIG. 2. The pixel electrode PE may overlap the common electrode CE in the vertical direction on the basis of a lower substrate 110 (see FIG. 2) which will be described later. Accordingly, the pixel electrode PE may be capacitively coupled with the common electrode CE to be described later. The common electrode CE may include a plurality of slit portions SLT.

Figure 2:
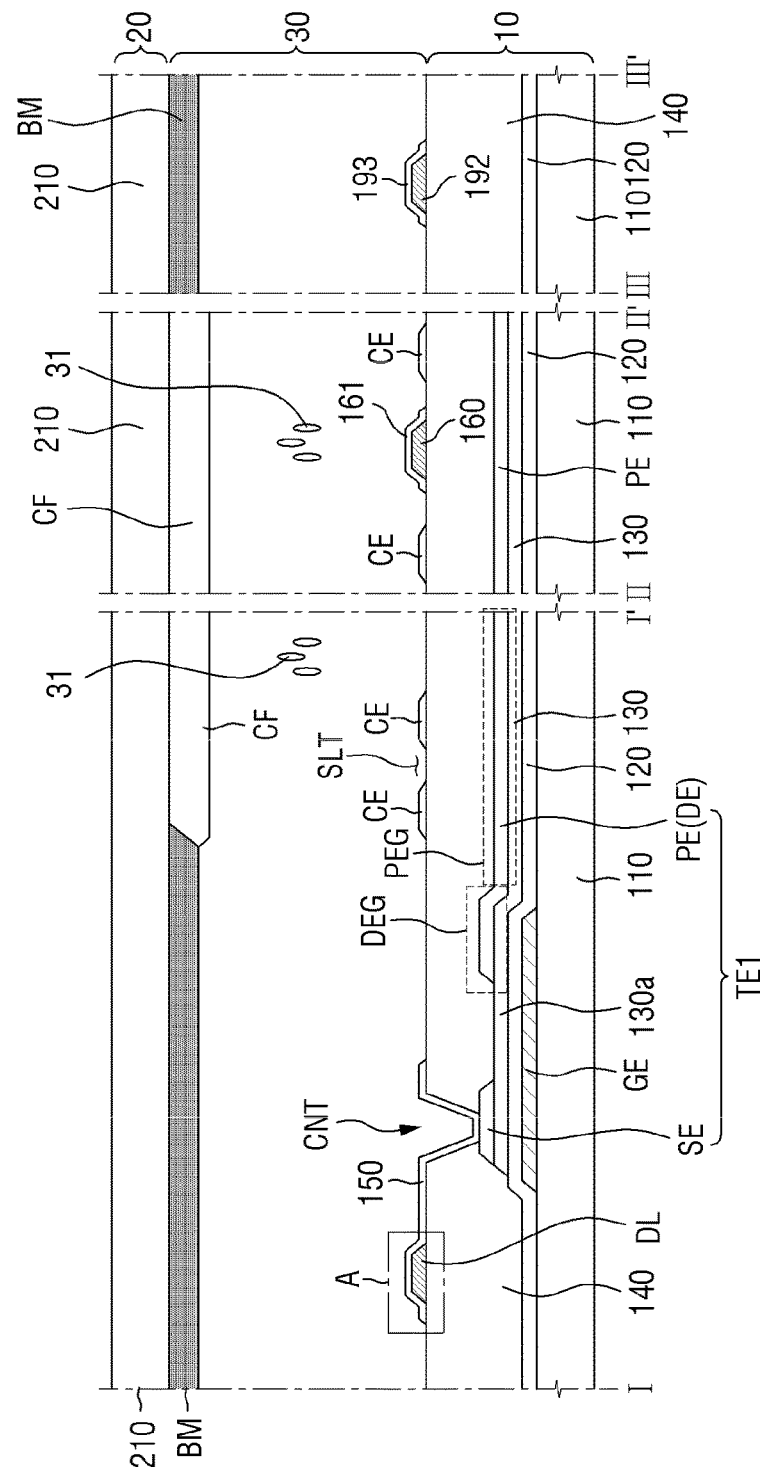
FIG. 2 is a cross-sectional view taken along the line I-I', the line II-II' and the line III-III" of FIG. 1.
Figure 3:
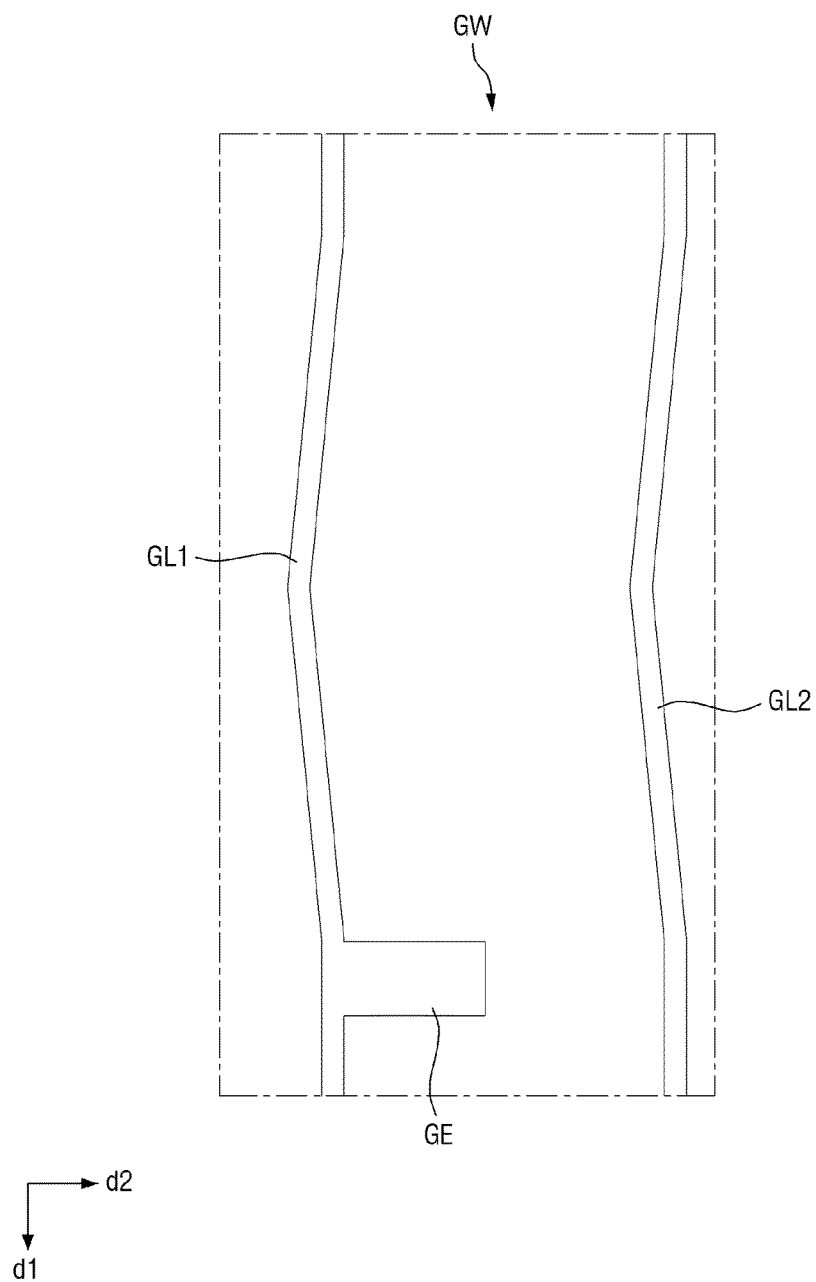
FIG. 3 is a plan view illustrating a gate conductor illustrated in FIG. 1.
Figure 4:
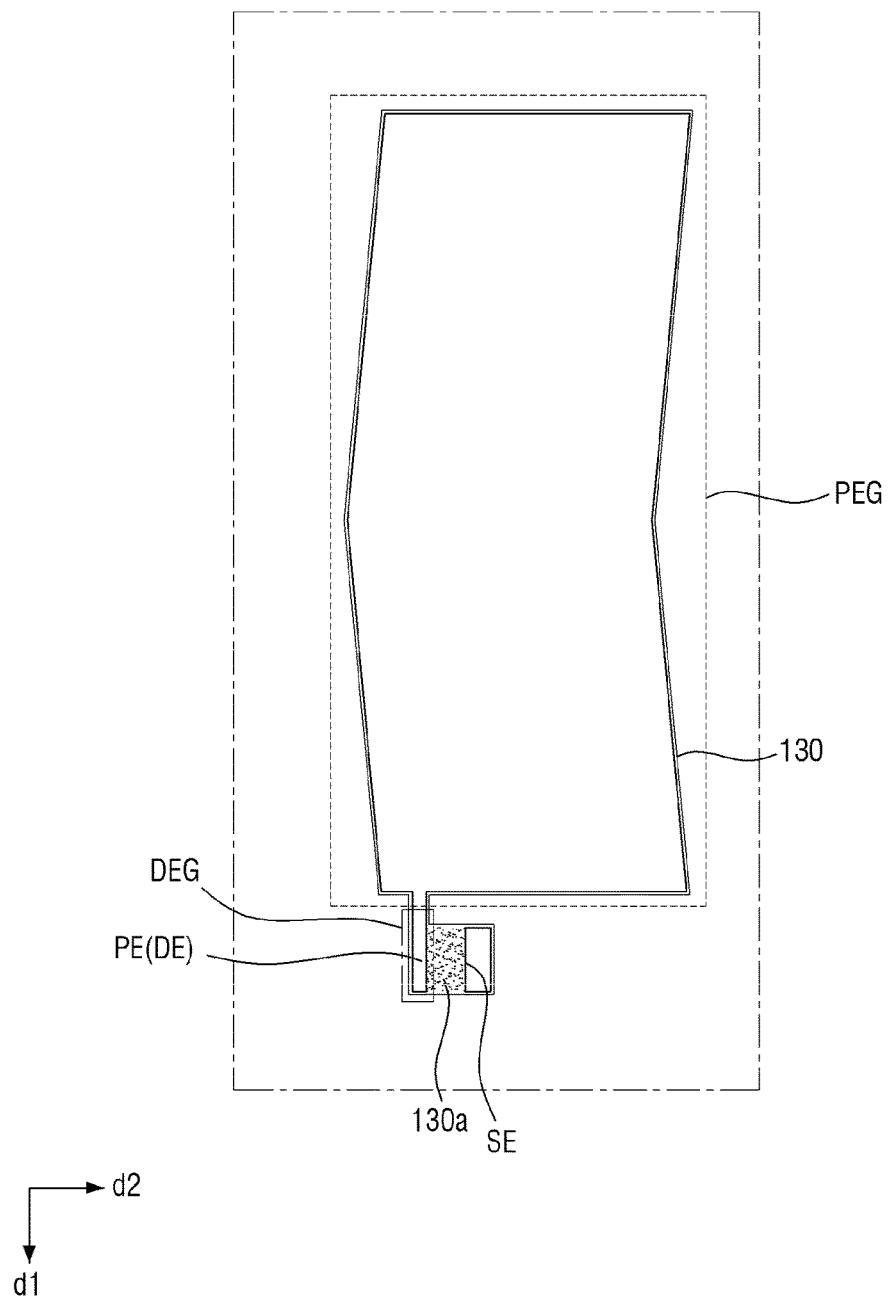
FIG. 4 is a plan view illustrating a first transparent electrode and a semiconductor pattern illustrated in FIG. 1.
Figure 5:
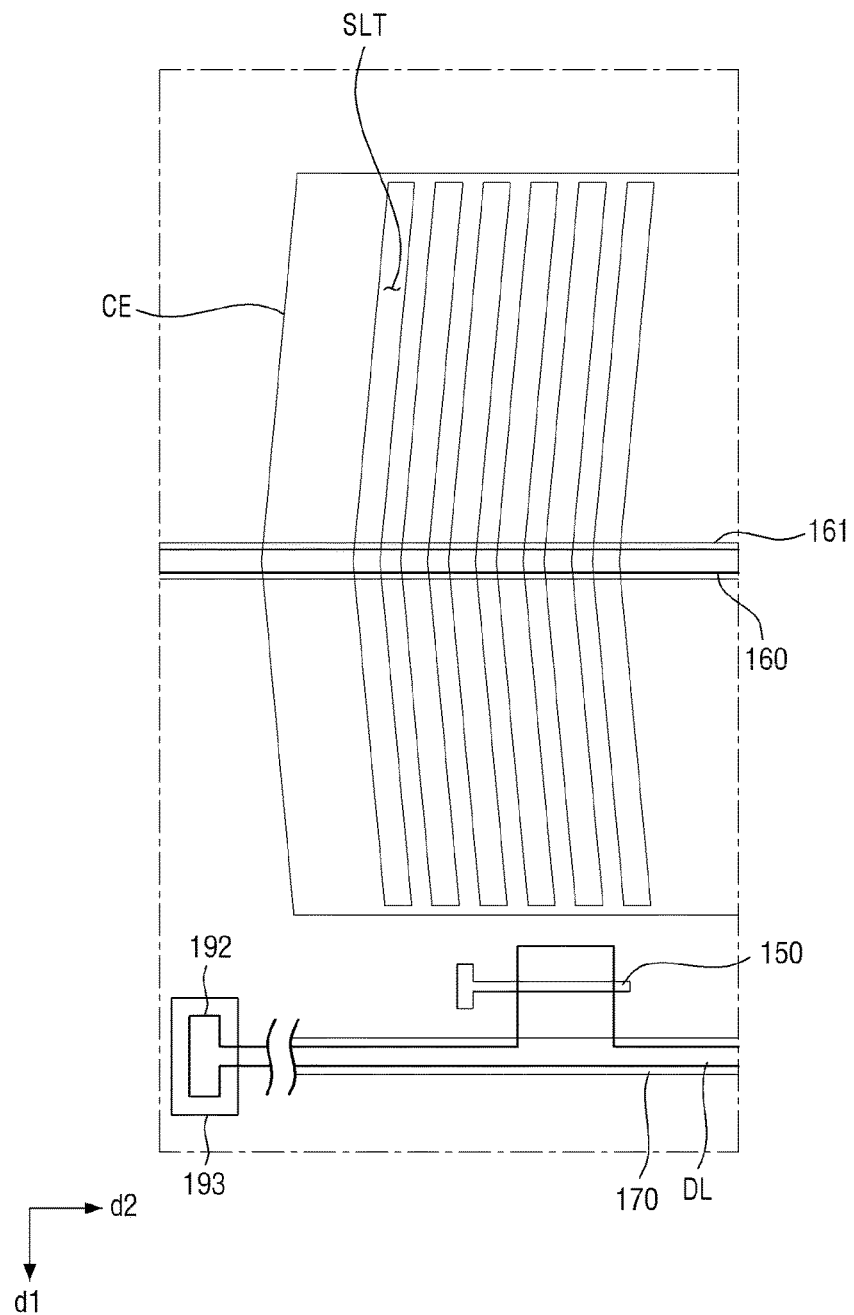
FIG. 5 is a plan view illustrating a data conductor, a common electrode and a connecting electrode illustrated in FIG. 1.

FIG. 2 is a cross-sectional view taken along the line I-I', the line II-II' and the line III-III" of FIG. 1. FIG. 3 is a plan view illustrating a gate conductor illustrated in FIG. 1. FIG. 4 is a plan view illustrating a first transparent electrode and a semiconductor pattern illustrated in FIG. 1. FIG. 5 is a plan view illustrating a data conductor, a common electrode and a connecting electrode illustrated in FIG. 1.

Referring to FIGS. 1 through 5, the lower display panel 10 may be disposed to face an upper display panel 20. The liquid crystal layer 30 may be interposed between the lower display panel 10 and the upper display panel 20 and may include a plurality of liquid crystal molecules 31. The lower display panel 10 may be bonded to the upper display panel 20 through sealing as an example.

First, the lower display panel 10 will be described.

As an example, the lower substrate 110 may be a transparent insulating substrate. Here, the transparent insulating substrate may include a glass substrate, a quartz substrate, a transparent resin substrate, or the like.

A gate conductor GW may be disposed on the lower substrate 110. The gate conductor GW may include a first gate line GL1, a second gate line GL2, and a gate electrode GE. The first gate line GL1 and the second gate line GL2 may extend along the first direction d1 on the lower substrate 110.

The gate electrode GE extends from the first gate line GL1. The gate electrode GE may be located on the same layer as the first gate line GL1. The gate electrode GE may be formed in a shape projecting from the first gate line GL1.

The gate conductor GW may be formed of a single film selected from conductive metals, including aluminum (Al), copper (Cu), molybdenum (Mo), chromium (Cr), titanium (Ti), tungsten (W), moly-tungsten (MoW), moly-titanium (MoTi), copper/moly-titanium (Cu/MoTi), a double film made up of at least two of the conductive metals listed, or a triple film made up of three of the conductive metals listed. The first gate line GL1, the second gate line GL2 and the gate electrode GE may be formed simultaneously, through the same mask process, for example.

The gate insulating film 120 may be disposed on the gate conductor GW. The gate insulating film 120 may be formed of silicon nitride (SiNx) or silicon oxide (SiOx), for example. The gate insulating film 120 may have a multiple film structure that includes at least two insulating films with physical characteristics different from each other.

The semiconductor pattern 130 may be disposed on the gate insulating film 120. The semiconductor pattern 130 may include a region 130a that forms a channel of the switching element TR. Meanwhile, the semiconductor pattern 130 may include an oxide semiconductor. The semiconductor pattern 130 may be formed of one selected from oxide semiconductors, including In—Ga-Zinc-Oxide (IGZO), ZnO, ZnO2, CdO, SrO, SrO2, CaO, CaO2, MgO, MgO2, InO, In2O2, GaO, Ga2O, Ga2O3, SnO, SnO2, GeO, GeO2, PbO, Pb2O3, Pb3O4, TiO, TiO2, Ti2O3 and Ti3O5.

The first transparent electrode TE1 may be disposed on the semiconductor pattern 130. The first transparent electrode TE1 is in direct contact with the semiconductor pattern 130. The first transparent electrode TE1 may be made of a transparent conductive material, such as indium tin oxide (ITO) and indium zinc oxide (IZO).

The first transparent electrode TE1 may include a first electrode and a second electrode that are disposed apart from each other. Here, the first electrode may be a source electrode SE of the switching element TR. Hereinafter, the first electrode will be described by being referred to as the source electrode SE.

As described above, the pixel electrode PE may be formed integrally with the drain electrode DE of the switching element TR, and as a result, the second electrode may be the pixel electrode PE. Hereinafter, both of the second electrode and the drain electrode DE will be referred to as the pixel electrode PE. The pixel electrode PE may include a drain region DEG that overlaps the gate electrode GE, and a pixel region PEG that overlaps the common electrode CE. The pixel electrode PE may be disposed on the same layer as the source electrode SE of the switching element TR and may be spaced apart from the source electrode SE at a predetermined distance.

The first transparent electrode TE1 and the semiconductor pattern 130 may be formed using a single mask process. Thus, the first transparent electrode TE1 may be disposed to completely overlap the semiconductor pattern 130 in the remaining regions, except the region 130a in which the channel of the switching element TR is formed. In other words, on the basis of the semiconductor pattern 130, the semiconductor pattern 130 may have substantially the same form as the first transparent electrode TE1, except the region 130a in which the channel of the switching element TR is formed.

The passivation film 140 may be disposed on the gate insulating film 120 as well as the first transparent electrode TE1. The passivation film 140 may be formed of an inorganic insulating material such as silicon nitride and silicon oxide, for example. The passivation film 140 may be formed on the first transparent electrode TE1 to prevent any pollutant of the process, which may be generated during formation of the data line DL to be described later, from flowing into the first transparent electrode TE1. Meanwhile, a contact hole CNT which exposes at least some of the source electrode SE may be formed on the passivation film 140.

The data line DL may be disposed on the passivation film 140 to extend in the second direction d2. The data line DL may be formed of a single film selected from conductive metals including aluminum (Al), copper (Cu), molybdenum (Mo), chromium (Cr), titanium (Ti), tungsten (W), moly-tungsten (MoW), moly-titanium (MoTi), copper/moly-titanium (Cu/MoTi), a double film made up of at least two of the conductive metals, or a triple film made up of three of the conductive metals. The data line DL may be electrically connected to a source electrode SE exposed by the contact hole CNT through a connecting electrode 150 to be described later.

More specifically, the connecting electrodes 150 may be disposed inside the contact hole CNT and on the passivation film 140. The connecting electrode 150 may be directly connected to the source electrode SE of the exposed switching element TR and the data line DL. Referring to the region A of FIG. 2, the connecting electrode 150 may be formed to cover the top of the data line DL, for example.

The connecting electrode 150 may be made of a transparent conductive material such as indium tin oxide (ITO) and indium zinc oxide (IZO). The connecting electrode 150 may be formed of the same material as the common electrode CE to be described later. Meanwhile, the connecting electrode 150 may be electrically insulated from the common electrode CE.

The second transparent electrode may be disposed on the passivation film 140. The second transparent electrode may be made of a transparent conductive material such as indium tin oxide (ITO) or indium zinc oxide (IZO). Here, the second transparent electrode may be a common electrode CE. Hereinafter, the second transparent electrode will be described as the common electrode CE.

The common electrode CE may be disposed on the passivation film 140. The common electrode CE may be disposed to at least partially overlap the pixel electrode PE and may be located on the same layer as the data line DL. The common electrode CE may include a plurality of slit portions SLT. The common electrode CE may form a horizontal electric field in relation with the pixel electrode PE through the plurality of slit portions SLT to control the alignment of a plurality of liquid crystal molecules 31. As illustrated in FIG. 1, the slit portion SLT of the common electrode CE may be disposed in the first direction d1 so that its long side is substantially parallel to the first gate line GL1. Also, when the first gate line GL1 has a bending structure, the slit portion SLT of the common electrode CE may also be in the form that is similar to the bending structure of the first gate line GL1.

The data retention line 160 may be disposed on the passivation film 140 to extend in the second direction d2. The data retention line 160 may at least partially overlap the pixel electrode PE and may extend to cross the central portion of the pixel electrode PE, for example. The data retention line 160 may be electrically connected to the common electrode CE through a common electrode connection portion 161. This makes it possible to reduce the resistance component of the common electrode CE.

The liquid crystal display device according to an embodiment of the inventive concept may further include a data pad portion 193 which is connected to the distal end 192 of the data line DL. The data pad portion 193 may connect the distal end 192 of the data line DL to an external device (not illustrated). The data pad portion 193 may be made of a transparent conductive material such as indium tin oxide (ITO) or indium zinc oxide (IZO).

The shield electrode 170 may overlap a plurality of data lines including the data lines DL in a direction perpendicular to the lower substrate 110. The shield electrode 170 may generally extend in the second direction d2. Thus, the shield electrode 170 may prevent a light leakage phenomenon caused by the coupling between the plurality of data lines DL and the pixel electrode adjacent to each data line.

Although it is not illustrated in the drawings, a lower alignment film may be disposed on the common electrode CE, the data retention line 160, the common electrode connection portion 161, the shield electrode 170 and the connecting electrode 150. The lower alignment film may be formed of polyimide or the like.

Next, the upper display panel 20 will be described.

The upper substrate 210 may be disposed to face the lower substrate 110. The upper substrate 210 may be formed of a transparent glass or plastic, and may, for example, be formed of the same material as the lower substrate 110.

A black matrix BM may be disposed on the upper substrate 210 to prevent light from passing through the regions other than the pixel region. The black matrix BM may be formed of a metallic material including an organic substance or chromium, for example.

A color filter CF may be placed on the black matrix BM and the upper substrate 210. More specifically, the color filter CF may be formed on the upper substrate 210 that corresponds to the pixel region defined by the black matrix BM, and at least a portion of the color filter CF may be formed on at least a portion of the black matrix BM. The color filter CF may display one of red, green or blue color, for example.

The description has been given where the color filter CF is located on the upper substrate 210 as an example, but the inventive concept is not limited thereto. That is, the color filter CF may be disposed on the lower substrate 110.

Although it is not illustrated in the drawings, an upper alignment film (not illustrated) may be disposed on the upper substrate 210. The upper alignment film may be formed of polyimide or the like.

Figure 6:
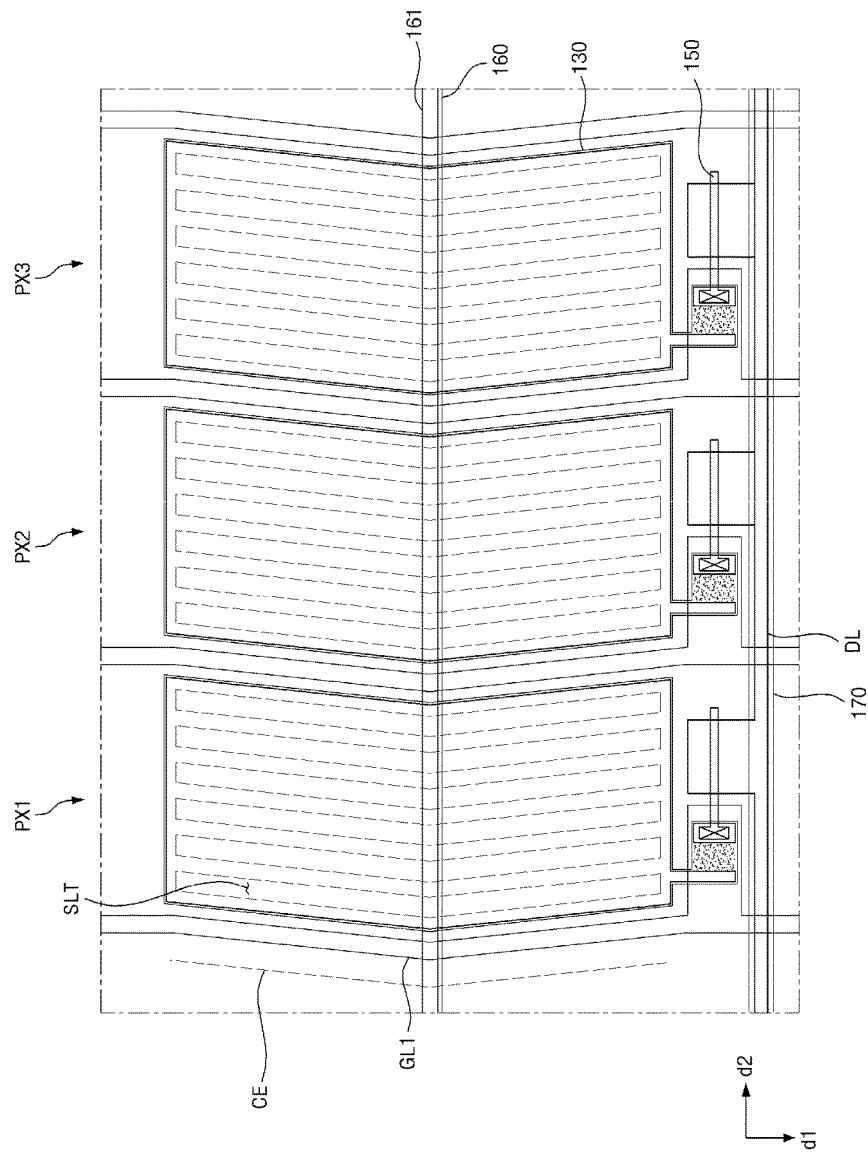
FIG. 6 is a layout diagram schematically illustrating first to third pixel portions PX1 to PX3 of the liquid crystal display device according to an embodiment of the inventive concept.

FIG. 6 is a layout diagram schematically illustrating the first to third pixel portions PX1 to PX3 of the liquid crystal display device according to an embodiment of the inventive concept. However, the repeated description of the contents described in FIGS. 1 to 5 will not be provided.

The first pixel portion PX1 may be electrically connected to the first gate line GL1 and the data line DL. The second pixel portion PX2 may be electrically connected to the second gate line GL2 and the data line DL. The third pixel portion PX3 may be electrically connected to the third gate line GL3 and the data line DL. That is, the first to third pixel portions PX1 to PX3 may be electrically connected to the same data line DL.

The first to third pixel portions PX1 to PX3 may display different colors from each other. As an example, the first pixel portion PX1 may display red, the second pixel portion PX2 may display green, and the third pixel portion PX3 may display blue. That is, because the first to third pixel portions PX1 to PX3 which display different colors from each other are connected with a single data line, it is possible to reduce the required number of data lines and the number of data driving integrated circuits connected thereto.

Hereinafter, in the present specification, a method of manufacturing the liquid crystal display device illustrated in FIGS. 1 and 2 will be described as an example.

Figure 7:
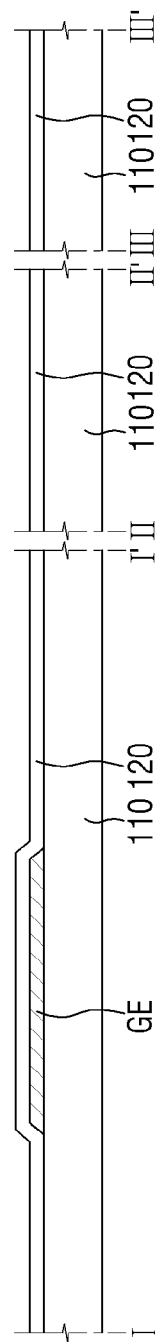
FIG. 7 is a diagram for explaining a method of forming a gate conductor, in the method of manufacturing the liquid crystal display device according to an embodiment of the inventive concept.

FIG. 7 is a diagram for explaining a method of forming a gate conductor, in the method of manufacturing the liquid crystal display device according to an embodiment of the inventive concept.

Referring to FIGS. 3 and 7, the gate conductor GW is formed on the lower substrate 110. The gate conductor GW forms a first gate line GL1, a second gate line GL2 and a gate electrode GE extending from the first gate line GL1.

Next, the gate insulating film 120 is formed on the gate conductor GW. The gate insulating film 120 may be formed by chemical vapor deposition. The gate insulating film 120 is formed over the entire surface of the lower substrate 110 in which the gate conductor GW is formed.

FIGS. 8 to 12 are diagrams for explaining a method of forming a first transparent electrode, in the method of manufacturing the liquid crystal display device according to an embodiment of the inventive concept.

Figure 8:
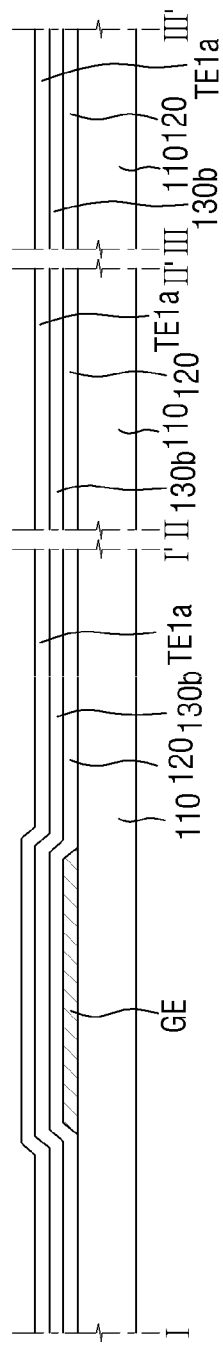
FIGS. 8, 9, 10, 11, and 12 are diagrams for explaining a method of forming a first transparent electrode, in the method of manufacturing the liquid crystal display device according to an embodiment of the inventive concept.

Referring to FIGS. 4 and 8, the semiconductor layer 130b and the first transparent conductive layer TE1a are sequentially laminated on the gate insulating film 120.

The semiconductor layer 130b may be laminated on the gate insulating film 120, by depositing the aforementioned oxide semiconductor through the chemical vapor deposition method, and may include IGZO, for example. The first transparent conductive layer TE1a may be formed of transparent conductive material such as indium tin oxide (ITO) and indium zinc oxide (IZO), or a reflective conductive material such as aluminum.

Figure 9:
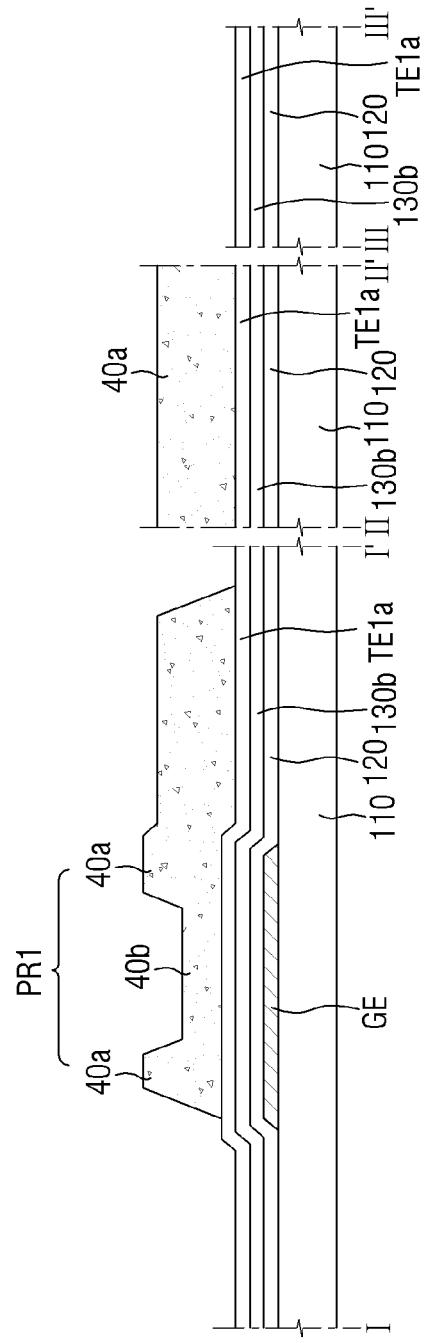

Next, referring to FIG. 9, the first photosensitive film pattern PR1 is formed by applying the photosensitive film over the first transparent conductive layer TE1a and by exposing and developing the photosensitive film using a half-tone mask (not illustrated) or a slit mask. The first photosensitive film pattern PR1 includes a first region 40a having a first thickness and a second region 40b having a second thickness smaller than the first thickness. The first region 40a of the first photosensitive film pattern PR1 is located in a portion in which the first transparent electrode TE1 is formed later. The second region 40b of the first photosensitive film pattern PR1 is located in the portion in which the channel region 130a of the switching element TR is to be formed.

Figure 10:
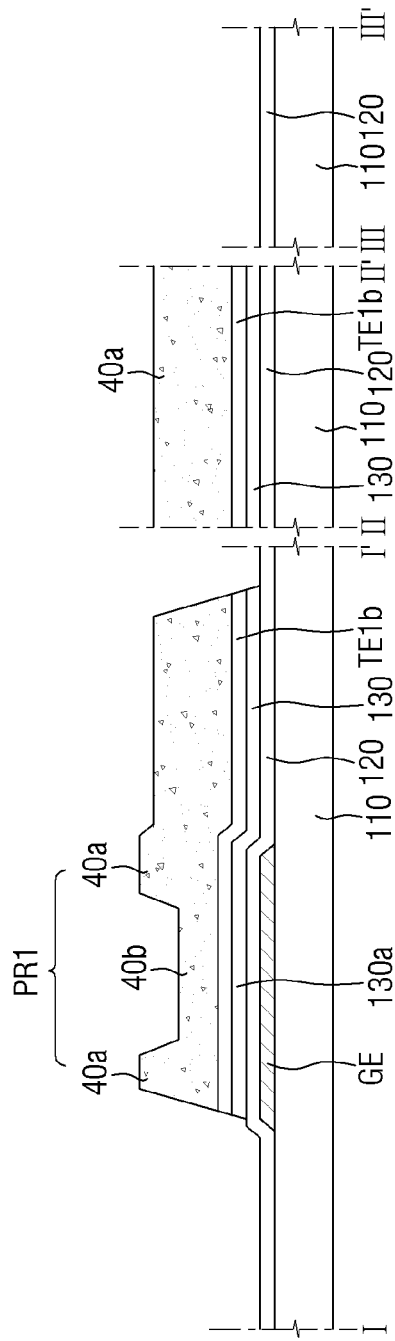

Referring to FIG. 10, the second transparent conductive layer TE1b is formed by etching the exposed first transparent conductive layer TE1 by using the first photosensitive film pattern PR1 as a mask. Next, the semiconductor pattern 130 is formed by etching the semiconductor layer 130b by using the first photosensitive film pattern PR1 as a mask.

At least some of the gate insulating film 120 is exposed through the aforementioned two etching processes. Further, each of one side surface of the second transparent conductive layer TE1b and the one side surface of the semiconductor pattern 130 may overlap each of the other side surface of the second transparent conductive layer TE1b and the other side surface of the semiconductor pattern 130 so as to be located on the substantially same plane.

Figure 11:
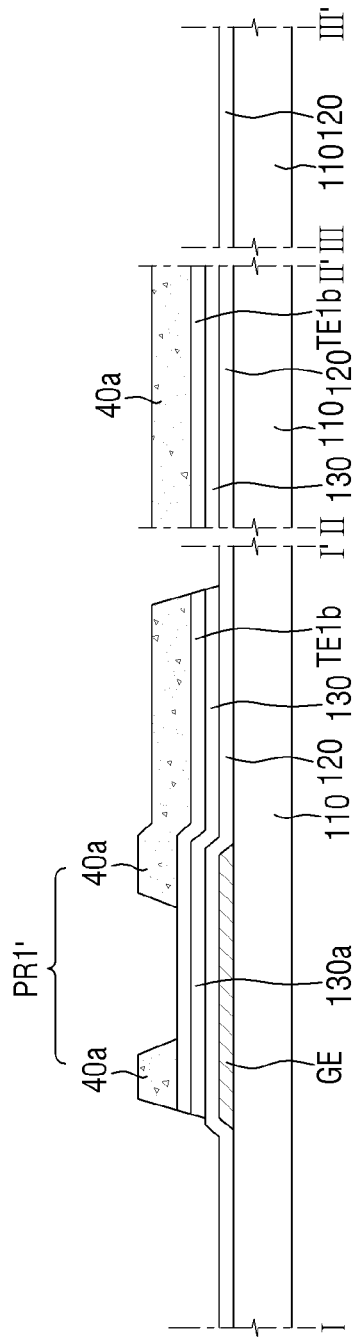

Next, referring to FIG. 11, the thickness of the first photosensitive film pattern PR1 is generally reduced to form a second photosensitive film pattern PR1' in which the second region 40b of the first photosensitive film pattern PR1 is removed. Thus, the second transparent conductive layer TE1b may be exposed at a position corresponding to the channel region of the switching element TR. The second photosensitive film pattern PR1' may be formed by an etch-back process, an ashing process or the like. Thereafter, the exposed second transparent conductive layer TE1b is etched by using the second photosensitive film pattern PR1' as a mask.

Figure 12:
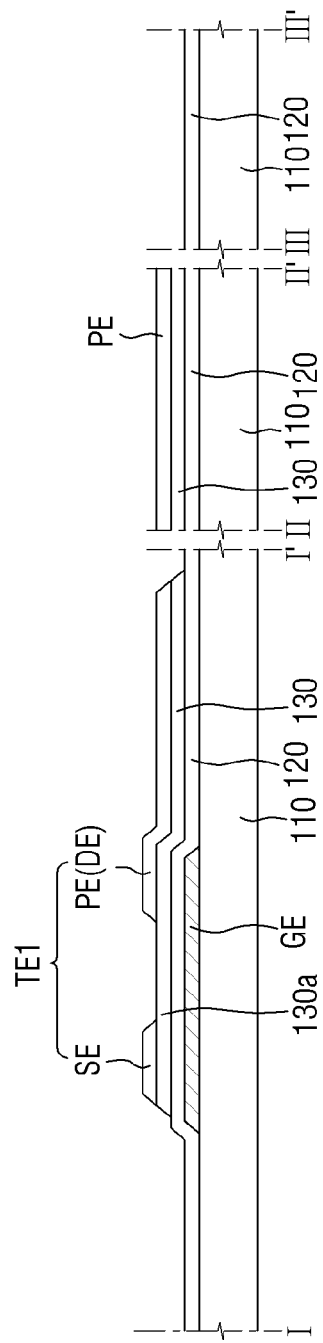

Referring to FIG. 12, by etching the exposed second transparent conductive layer TE1b using the second photosensitive film pattern PR1' as a mask, the first transparent electrode TE1 is formed. After that, the second photosensitive film pattern PR1' is stripped. Thus, the first transparent electrode TE1 is formed which has the source electrode SE and the pixel electrode PE that are spaced apart from each other at a predetermined distance. Here, the pixel electrode PE is formed integrally with the drain electrode DE as described above.

FIGS. 13 to 17 are diagrams for explaining the method of forming the passivation film, the data line and the data retention line, in the method of manufacturing the liquid crystal display device according to an embodiment of the inventive concept.

Figure 13:
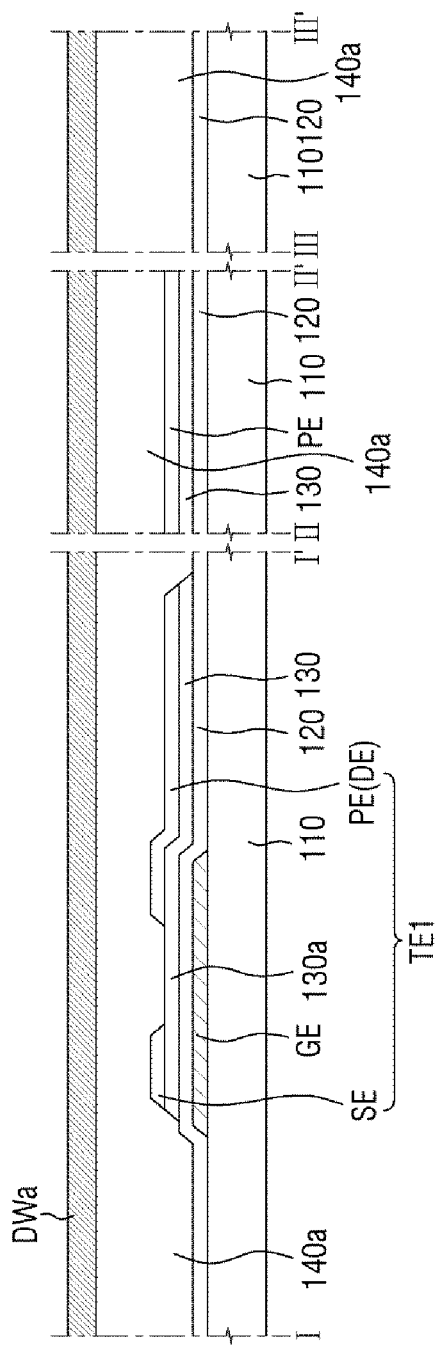
FIGS. 13, 14, 15, 16, and 17 are diagrams for explaining a method of forming a passivation film, a data line and a data retention line, in the method of manufacturing the liquid crystal display device according to an embodiment of the inventive concept.

Referring to FIGS. 5 and 13, an inorganic insulating layer 140a and a first data conductor DWa are sequentially laminated on the semiconductor pattern 130, the source electrode SE and the pixel electrode PE. The inorganic insulating layer 140a may be formed of an inorganic insulating material such as silicon oxide or silicon nitride, for example. The inorganic insulating layer 140a is formed on the first transparent electrode TE1 and the gate insulating film 120 to prevent any pollutants in the process, which may occur during formation of the data line DL to be described later, from flowing into the first transparent electrode TE1.

Figure 14:
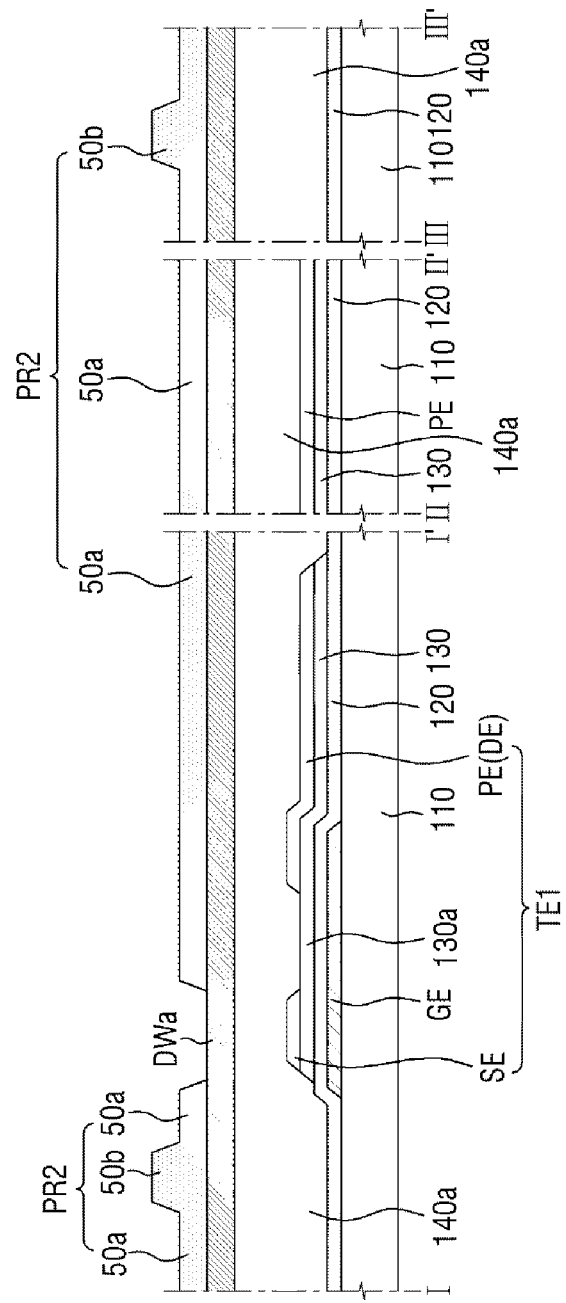

Next, referring to FIG. 14, the photosensitive film is applied to the top of the first data conductors DWa, and the photosensitive film is exposed and developed using a large area half-tone mask (not illustrated) or a slit mask to form a third photosensitive film pattern PR2. The third photosensitive film pattern PR2 includes a first region 50a having a first thickness and a second region 50b having a second thickness greater than the first thickness. The third photosensitive film pattern PR2 is not formed in the portion in which a contact hole CNT to be described later is formed. Thus, the first data conductor DWa is partially exposed.

Figure 15:
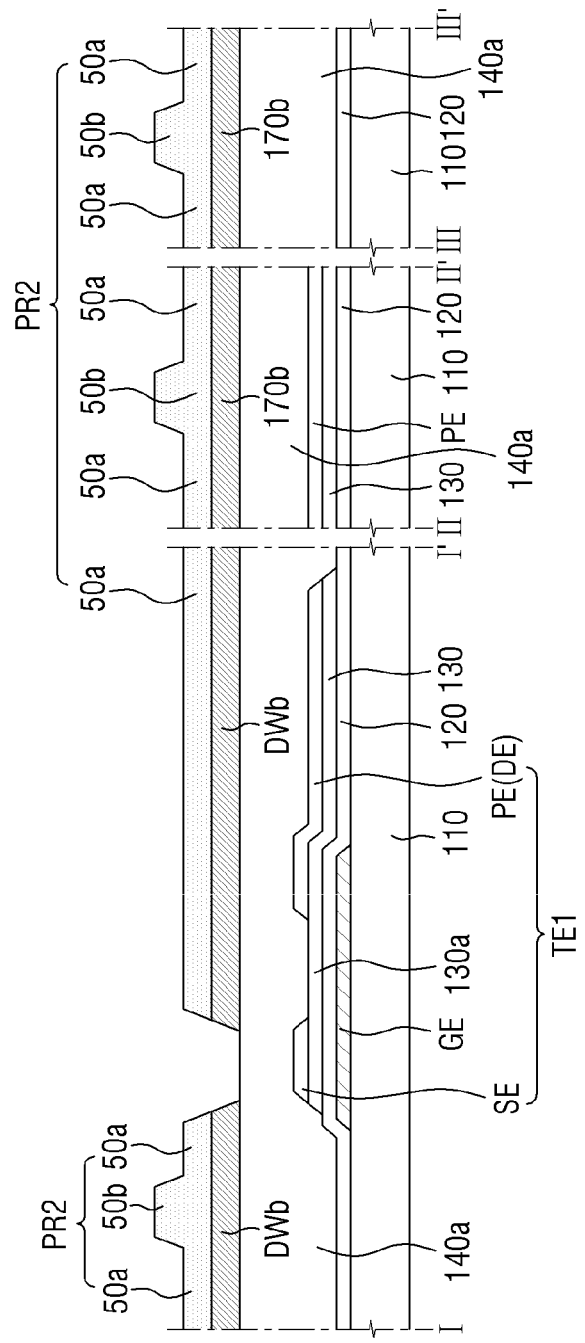

Next, referring to FIG. 15, by etching the exposed first data conductor DWa using the third photosensitive film pattern PR2 as a mask, a second data conductor DWb which partially exposes the inorganic insulating layer 140a is formed. Subsequently, referring to FIG. 16, by etching the exposed inorganic insulating layer 140a by using the third photosensitive film pattern PR2 as a mask, a passivation film 140 which partially exposes the source electrode SE through the contact hole CNT may be formed. Next, the thickness of the third photosensitive film pattern PR2 is generally reduced to form a fourth photosensitive film pattern PR2' in which the first region 50a is removed.

Figure 16:
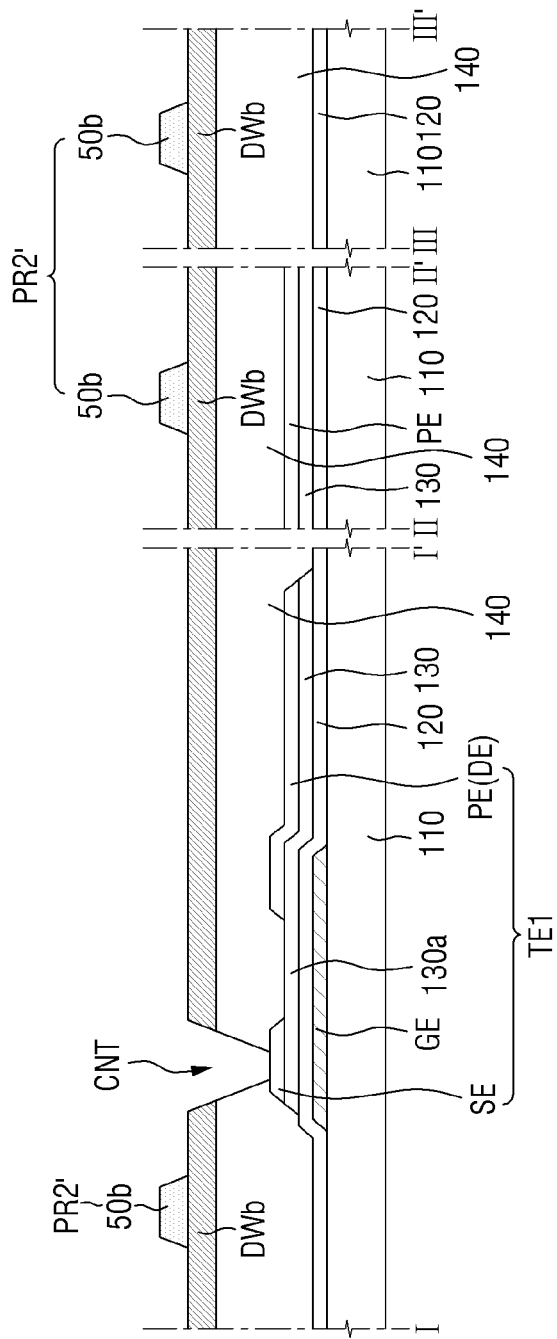
Figure 17:
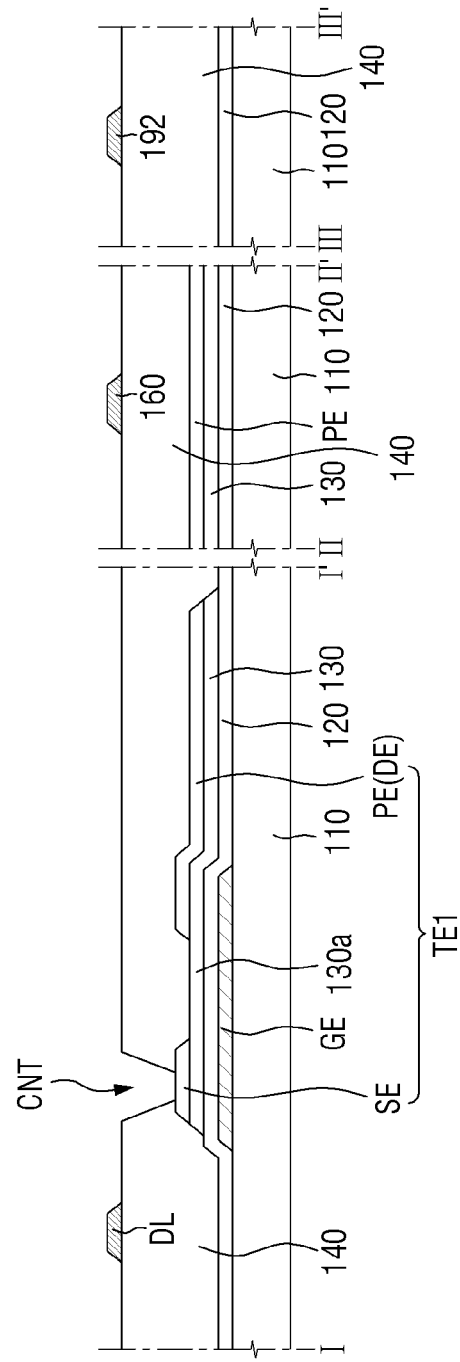

Referring to FIG. 16, the exposed second data conductor DWb is etched using the fourth photosensitive film pattern PR2' as a mask. Referring to FIG. 17, as the second data conductor DWb is etched, the data line DL and a data retention line 160 are formed. Thereafter, the fourth photosensitive film pattern PR2' is removed.

Figure 18:
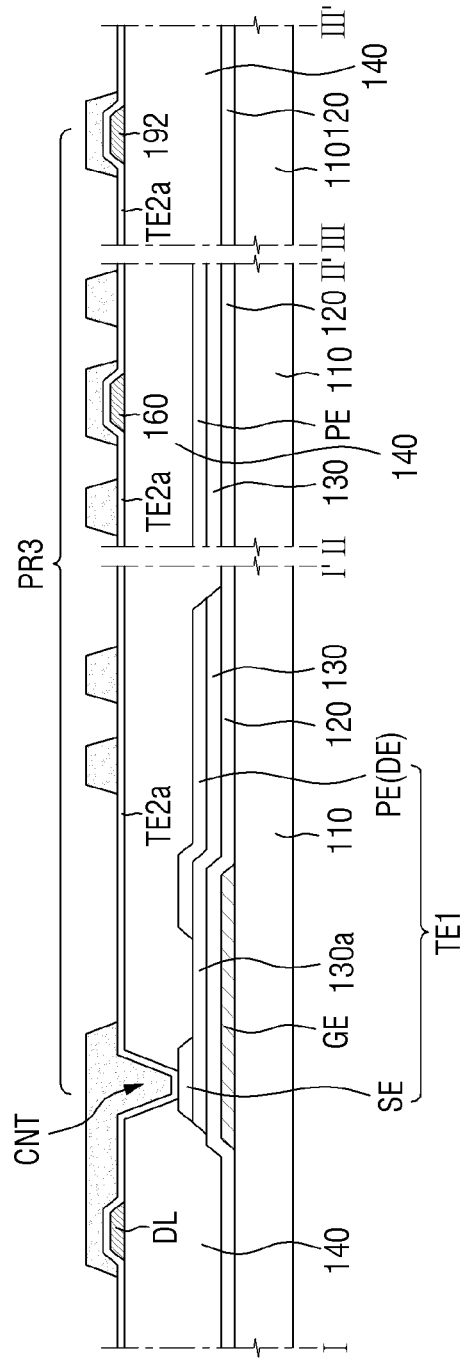
FIGS. 18, 19, and 20 are diagrams for explaining a method of forming a common electrode, a shield electrode and a connecting electrode, in the method of manufacturing the liquid crystal display device according to an embodiment of the inventive concept.
Figure 19:
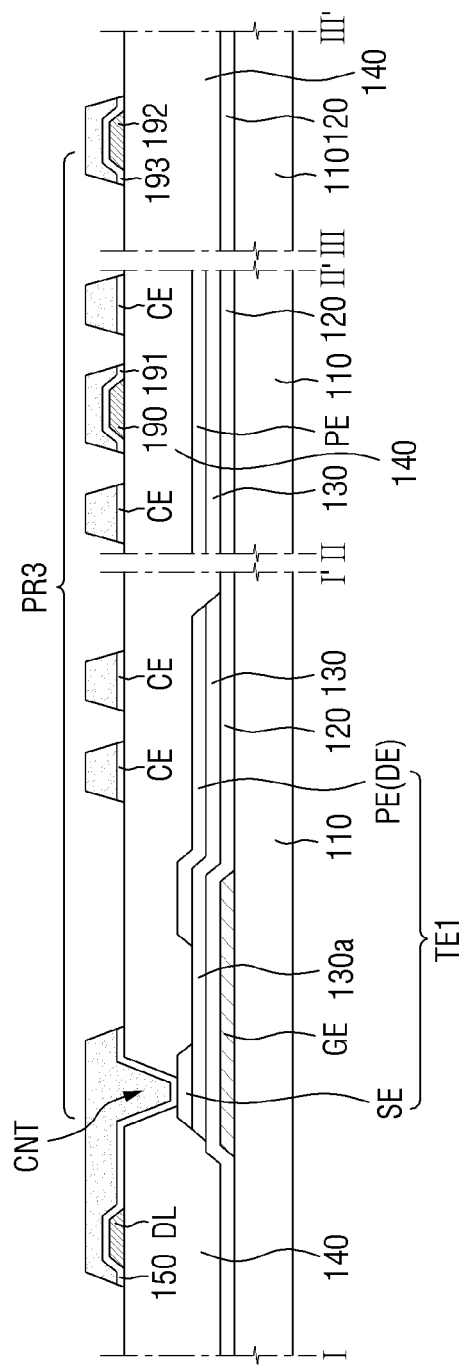
Figure 20:
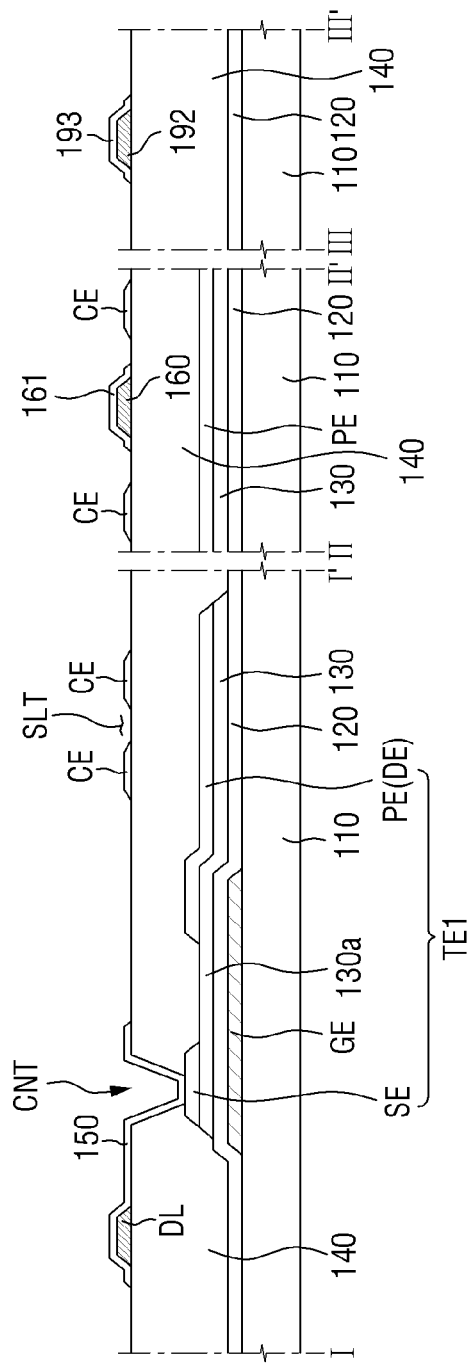

FIGS. 18 to 20 are diagrams for explaining a method of forming the common electrode, the shield electrode and the connecting electrode, in the method of manufacturing the liquid crystal display device according to an embodiment of the inventive concept.

Referring to FIG. 18, a third transparent conductive layer TE2a is formed on the data line DL and the data retention line 160. The third transparent conductive layer TE2a may be made of a transparent conductive material such as indium tin oxide (ITO) and indium zinc oxide (IZO). The third transparent conductive layer TE2a may be formed on each of the data line DL, the data retention line 160 and the distal end 192 of the data line DL. Thereafter, by applying the photosensitive film onto the third transparent conductive layer TE2a, and by exposing and developing the photosensitive film using a large area half-tone mask (not illustrated) or a slit mask, a fifth photosensitive film pattern PR3 is formed. Thus, the third transparent conductive layer TE2a is partially exposed.

Referring to FIGS. 19 and 20, as the exposed third transparent conductive layer TE2a is etched using the fifth photosensitive film pattern PR3 as a mask, a connecting electrode 150, a common electrode CE, a shield electrode 170, a common electrode connection portion 161 and a data pad portion 193 are formed. The connecting electrode 150 is formed on the same layer as the common electrode CE and the shield electrode 170, but is formed so as to be insulated from the common electrode CE and the shield electrode 170. In contrast, the data retention line 160 may be electrically connected to the common electrode CE through the common electrode connection portion 161. Thereafter, the fifth photosensitive film pattern PR3 is removed.

While the inventive concept has been particularly illustrated and described with reference to exemplary embodiments thereof, it will be understood by those of ordinary skill in the art that various changes in form and detail may be made therein without departing from the spirit and scope of the inventive concept as defined by the following claims. The exemplary embodiments should be considered in a descriptive sense only and not for purposes of limitation.

What is claimed is:

1. A liquid crystal display device comprising:
 a substrate;
 a gate line that is disposed on the substrate and extends in a first direction;
 a first insulating film that is disposed on the gate line;
 a semiconductor pattern that is disposed on the first insulating film;
 a first transparent electrode that is disposed on the semiconductor pattern, and has a first electrode and a second electrode being spaced apart from each other;
 a second insulating film that is disposed on the first transparent electrode and partially exposes the first electrode;
 a data line that is disposed on the second insulating film and extends in a second direction different from the first direction;
 a second transparent electrode that is disposed on the second insulating film and at least partially overlaps the second electrode; and
 a connecting electrode that is in direct contact with a portion of the exposed first electrode and the data line.

2. The liquid crystal display device of claim 1, wherein the first electrode and the second electrode are in direct contact with the semiconductor pattern.

3. The liquid crystal display device of claim 1, wherein the first electrode and the second electrode overlap the semiconductor pattern, except in a region overlapping a channel of a switching element.

4. The liquid crystal display device of claim 1, further comprising:
 a gate electrode which is disposed on the same layer as the gate line and extends from the gate line, and
 the second electrode comprises a drain region that overlaps the gate electrode, and a pixel region that overlaps the second transparent electrode.

5. The liquid crystal display device of claim 4, wherein the first electrode overlaps the gate electrode.

6. The liquid crystal display device of claim 4, further comprising:
 a switching element in which the gate line is electrically connected to the gate electrode, the data line is electrically connected to the first electrode, and the pixel region is electrically connected to the drain region.

7. The liquid crystal display device of claim 1, wherein the semiconductor pattern comprises an oxide semiconductor.

8. The liquid crystal display device of claim 1, wherein the connecting electrode comprises a transparent conductive material.

9. The liquid crystal display device of claim 1, further comprising:
a data retention line that is disposed on the second insulating film and extends in the second direction.

10. The liquid crystal display device of claim 1, wherein the second transparent electrode comprises a plurality of slit portions.

11. A liquid crystal display device comprising:
a substrate;
a gate conductor that is disposed on a substrate, and comprises a gate line extending in a first direction and a gate electrode extending from the gate line;
a first insulating film that is disposed on the gate conductor;
a semiconductor pattern that is disposed on the gate conductor;
a first transparent electrode that is disposed on the semiconductor pattern, and has a first electrode that overlaps the gate electrode, and a second electrode spaced apart from the first electrode at a predetermined distance;
a second insulating film that is disposed on the first transparent electrode and partially exposes the first electrode;
a data line that is disposed on the second insulating film and extends in a second direction different from the first direction;
a second transparent electrode that is disposed on the second insulating film and at least partially overlaps the second electrode; and
a connecting electrode that is in direct contact with the exposed first electrode and the data line.

12. The liquid crystal display device of claim 11, wherein the first electrode and the second electrode are in direct contact with the semiconductor pattern.

13. The liquid crystal display device of claim 11, wherein the first electrode and the second electrode overlap the semiconductor pattern, except in a region overlapping a channel of a switching element.

14. The liquid crystal display device of claim 11, wherein the second insulating film comprises an inorganic substance.

15. The liquid crystal display device of claim 11, wherein the connecting electrode comprises at least one of indium tin oxide (ITO) and indium zinc oxide (IZO).

16. The liquid crystal display device of claim 11, wherein the connecting electrode covers the top of the data line.

* * * * *